US012595341B2

(12) United States Patent
Movahhed et al.

(10) Patent No.: US 12,595,341 B2
(45) Date of Patent: Apr. 7, 2026

(54) PROCESS FOR CONTINUOUS SUPERCRITICAL DRYING OF AEROGEL PARTICLES

(71) Applicant: aerogel-it GmbH, Osnabrueck (DE)

(72) Inventors: Sohajl Movahhed, Lemfoerde (DE); Wibke Loelsberg, Ludwigshafen (DE); Dirk Weinrich, Lemfoerde (DE); Marc Fricke, Lemfoerde (DE); Raman Subrahmanyam, Hamburg (DE); Irina Smirnova, Hamburg (DE); Pavel Gurikov, Hamburg (DE); Fynn Missfeldt, Hamburg (DE)

(73) Assignee: aerogel-it GmbH, Osnabrueck (DE)

( * ) Notice: Subject to any disclaimer, the term of this patent is extended or adjusted under 35 U.S.C. 154(b) by 1140 days.

(21) Appl. No.: 17/275,151

(22) PCT Filed: Sep. 12, 2019

(86) PCT No.: PCT/EP2019/074394
§ 371 (c)(1),
(2) Date: Mar. 10, 2021

(87) PCT Pub. No.: WO2020/053349
PCT Pub. Date: Mar. 19, 2020

(65) Prior Publication Data
US 2022/0041817 A1 Feb. 10, 2022

(30) Foreign Application Priority Data
Sep. 12, 2018 (EP) ..................................... 18193962

(51) Int. Cl.
| | |
|---|---|
| *C08J 3/075* | (2006.01) |
| *B01J 3/00* | (2006.01) |
| *C08J 9/28* | (2006.01) |
| *C08L 5/04* | (2006.01) |
| *F16L 59/02* | (2006.01) |
| *F26B 17/14* | (2006.01) |
| *F26B 21/14* | (2006.01) |

(52) U.S. Cl.
CPC .............. *C08J 3/075* (2013.01); *B01J 3/008* (2013.01); *C08J 9/28* (2013.01); *C08L 5/04* (2013.01); *F26B 17/14* (2013.01); *F26B 21/14* (2013.01); *C08J 2205/026* (2013.01); *C08J 2305/04* (2013.01); *F16L 59/02* (2013.01)

(58) Field of Classification Search
CPC ........ C08J 3/075; C08J 9/28; C08J 2205/026; C08J 2305/04; B01J 3/008; B01J 13/0091; C08L 5/04; F26B 17/14; F26B 21/14; F16L 59/02; A61K 8/0279; C01B 33/1585
See application file for complete search history.

(56) References Cited

U.S. PATENT DOCUMENTS

| | | | |
|---|---|---|---|
| 2,868,280 A | 1/1959 | Sargent et al. | |
| 3,195,613 A | 7/1965 | Hawkins | |
| 4,845,056 A | 7/1989 | Yamanis | |
| 5,306,555 A | 4/1994 | Ramamurthi et al. | |
| 5,962,539 A | 10/1999 | Perrut et al. | |
| 6,516,537 B1 * | 2/2003 | Teich | C01B 33/158 |
| | | | 34/340 |
| 6,670,402 B1 | 12/2003 | Lee et al. | |
| 7,731,783 B2 | 6/2010 | Sprouse et al. | |
| 7,781,492 B2 | 8/2010 | Williams et al. | |
| 9,073,759 B2 | 7/2015 | Zeng et al. | |
| 2012/0142800 A1 * | 6/2012 | Fricke | C08G 18/3237 |
| | | | 521/163 |
| 2017/0081494 A1 | 3/2017 | Fricke et al. | |

FOREIGN PATENT DOCUMENTS

| | | | |
|---|---|---|---|
| DE | 198 10 565 | 9/1999 | |
| DE | 19810565 A1 * | 9/1999 | B01D 12/00 |
| GB | 773 549 | 4/1957 | |
| KR | 10-2010-0086297 | 7/2010 | |
| WO | 2018/007740 | 1/2018 | |

OTHER PUBLICATIONS

Groult et al., "*Thermal conductivity/structure correlations in thermal super-insulating pectin aerogels*", Carbohydrate Polymers, vol. 196, 2018, pp. 73-81.
International Preliminary Report on Patentability issued Mar. 18, 2021, in PCT/EP2019/074394, 8 pages.
Raman et al., "*Hybrid alginate based aerogels by carbon dioxide induced gelation: Novel technique for multiple applications*", The Journal of Supercritical Fluids, vol. 106, 2015, pp. 23-33.
Robitzer et al., "*Natural materials with high surface area. Physisorption methods for the characterization of the texture and surface of polysaccharide aerogels*", Microporous and Mesoporous Materials, vol. 140, 2011, pp. 9-16.

* cited by examiner

*Primary Examiner* — Snigdha Maewall
(74) *Attorney, Agent, or Firm* — Grüneberg Global IP, PLLC

(57) ABSTRACT
Processes for drying gel particles, in particular for producing aerogels, involve providing a suspension containing gel particles and a solvent, introducing the suspension into a column where carbon dioxide flows in countercurrent, and removing dried aerogel particles from the column. The suspension is introduced in the top region of the column and dried aerogel particles are removed in the lower region. Pressure and temperature in the column are set such that the mixture of carbon dioxide and solvent is virtually supercritical or is supercritical. The aerogel particles can be discharged via discharge vessels or continuous decompression. Aerogel particles can be obtained by such a process and the aerogel particles can be used for medical and pharmaceutical applications, as additive or carrier material for additives for foods, as catalyst support, for cosmetic, hygiene, washing and cleaning applications, for production of sensors, for thermal insulation, or as a core material for VIPs.

7 Claims, No Drawings

PROCESS FOR CONTINUOUS SUPERCRITICAL DRYING OF AEROGEL PARTICLES

CROSS-REFERENCE TO RELATED APPLICATIONS

This application is the National Stage entry under § 371 of International Application No. PCT/EP2019/074394, filed on Sep. 12, 2019, and which claims the benefit of European Application No. 18193962.0, filed on Sep. 12, 2018. The content of each of these applications is hereby incorporated by reference in its entirety.

BACKGROUND OF THE INVENTION

Field of the Invention

The present invention relates to processes for drying gel particles, in particular for producing aerogels, comprising providing a suspension comprising gel particles (P1) and a solvent (LM), introducing the suspension into a column through which carbon dioxide flows in countercurrent, and removing the dried aerogel particles from the column, wherein the suspension is introduced in the top region of the column and the dried aerogel particles are removed in the lower region of the column, and wherein the pressure and temperature in the column are set such that the mixture of carbon dioxide and solvent is virtually supercritical or is supercritical. The aerogel particles can be discharged both via discharge vessels and via continuous decompression. The present invention further relates to aerogel particles obtainable or obtained by such a process, and to the use of the aerogel particles according to the invention for medical and pharmaceutical applications, as additive or carrier material for additives for foods, as catalyst support, for cosmetic, hygiene, washing and cleaning applications, for the production of sensors, for thermal insulation or as a core material for VIPs.

Description of Related Art

Porous materials such as inorganic or organic aerogels are suitable for various applications. Porous materials having particle diameters in the size range of a few micrometers and a high porosity of at least 70% are for example in view of theoretical considerations particularly good thermal insulators.

Organic and inorganic aerogels and xerogels, and processes for producing them, are known from the prior art. In order to obtain a porous material, for example an aerogel, from the gel, the liquid must be removed. For the sake of simplicity, this step is referred to hereinafter as drying.

In the continuous production of particles in pressurized apparatuses, the continuous decompression of the particles produced to ambient pressure is problematic in particular. Problems that arise when decompressing particle-fluid streams by means of valves include, inter alia, abrasion and blocking of the valves. In addition to the continuous decompression via valves or the semicontinuous decompression via discharge vessels, continuous valve-free processes for decompressing particle-fluid streams using various devices for regulating the outlet flow are known.

Processes for the supercritical drying of gels are also known from the prior art. In supercritical drying, the interfacial tension of the fluid present in the mesoporous particles is completely or largely eliminated with the aim of largely preventing shrinking of the mesoporous and macroporous particles on drying, since characteristic properties of the porous particles, in particular of the meso- and macroporous particles, are wholly or partially lost during shrinking. Such a product obtained by supercritical drying in the case of gels is called an aerogel. Unlike with conventional drying without special precautions, in which the gels suffer from a large contraction in volume and xerogels are produced, only a slight volume contraction (<15%) thus takes place when drying near to or above the critical point.

The U.S. Pat. Nos. 2,868,280 and 4,845,056 disclose continuous processes for producing aerogel particles by means of supercritical drying. Here, a pump is used to bring the gel suspensions to a pressure above the critical pressure of the fluid surrounding the gel particles. The suspension flows through a heated pipe and is brought to a temperature above the critical temperature of the fluid, and is then decompressed adiabatically. The aerogel particles formed are separated from the gas stream by means of gas cyclones and/or filters.

U.S. Pat. No. 2,868,280 describes a continuous process for the production of supercritically dried inorganic aerogel particles. The sol is continuously gelled in a tubular reactor at elevated temperatures and pressures and is decompressed at the end of the reactor, at which the fluid is in the supercritical state, via a valve.

U.S. Pat. No. 4,845,056 discloses a continuous process for producing aerogel-ceramic powders with continuous production of the sol by hydrolysis of an alkoxide, above the critical pressure of the liquid phase, in a tubular reactor. After the hydrolysis, the sol is conveyed continuously into a heating zone and, after reaching a temperature above the critical temperature of the liquid phase, the ceramic powder which is present suspended in a supercritical fluid is decompressed adiabatically.

For the continuous decompression of aerogels, a distinction must be made between two types of aerogel production: 1. high-temperature supercritical drying (HTSCD) and 2. low-temperature supercritical drying (LTSCD). The processes specified above are continuous processes using the HTSCD process, which also include a continuous decompression of the aerogel particles.

No truly continuous process with continuous decompression of the particles exists for the LTSCD process using $CO_2$ as the supercritical fluid. In the current prior art, the $CO_2$-dried aerogels are decompressed in batches with slow decompression rates of 0.05-5 bar/min. (U.S. Pat. No. 7,781,492 B2, U.S. Pat. No. 9,073,759 B2, US 2017/0081494 A1, WO 2018/007740 A1, U.S. Pat. No. 5,306,555)

Special devices for enclosing the aerogels in sturdy vessels make it possible in U.S. Pat. No. 5,686,031 to choose decompression rates which are 20-200 times higher than usual. 0.35 bar/min is given as a usual decompression rate.

In WO 2018/007740 A1, $CO_2$ is exchanged for nitrogen before the decompression in order to enable a more rapid decompression. The decompression rates are not specified precisely, but a decompression is made possible within minutes instead of within hours.

U.S. Pat. No. 6,670,402 discloses a technique for increasing the decompression rate by exchanging the supercritical $CO_2$ with a non-reacting, non-condensing fluid before or during the decompression and by the application of pressure pulses of varying frequencies in order to accelerate mass transfer.

U.S. Pat. No. 3,195,613 discloses a process for the continuous decompression of solid-liquid mixtures from approximately 30 bar to ambient pressure using the example of ethylene polymerization over a long pipe. The decompression causes a (partial) flash evaporation of the liquid and, with the accompanying volume expansion, the pressure drop is further increased. The outlet stream is regulated by blanketing with an inert gas stream or by altering the cross-sectional area or length of the outlet nozzle.

U.S. Pat. No. 7,731,783 B2 discloses a process for the continuous decompression of a gas-solid system via a long pipe with additional internals for increasing the pressure drop and a device for regulating the exiting particle-gas stream.

The disadvantages of the mentioned process for continuous drying by the HTSCD process are the guidance of drying fluid and gel particles in concurrent. The entire fluid stream in which the particles are suspended has to be in a supercritical state at the outlet. This heating to temperatures above the critical temperature of the fluid requires a large amount of energy. In addition, because of the required high temperatures, the processes are not suitable for the continuous supercritical drying of organic, such as e.g. biopolymer-based, gels.

A widely used process for the supercritical drying of temperature-sensitive aerogels is the extraction of the solvent with $CO_2$ at a pressure above the critical pressure of the mixture and at a temperature above the critical temperature of the $CO_2$. This is usually carried out in batches. This consumes a large amount of $CO_2$ per kg of aerogel, as towards the end of the process there needs to be an outlet concentration of solvent in the $CO_2$ stream of <1-2%.

An alternative to the batch process is a quasi-continuous drying in countercurrent by means of cascade operation, as is customary in the extraction of solids with supercritical fluids. However, this process is associated with high process-related expense and high apparatus costs due to the large number of vessels (number of stages=number of vessels).

U.S. Pat. No. 5,962,539 describes a semi-continuous process for the supercritical drying of aerogels with $CO_2$ which is operated with a simulated continuous mode of operation. Here, n pressure vessels are operated in parallel and are situated each offset by a period of time A tin the extraction process of the supercritical drying. In this way, constant discharge flows and constant required inlet flows arise over time.

KR20100086297 discloses a process for the continuous countercurrent drying of aerogel particles by means of supercritical fluids. Aerogel particles having a diameter of 0.1-1 mm are led with a conveying screw in countercurrent to supercritical $CO_2$ or supercritical methanol.

The U.S. Pat. No. 6,516,537 discloses a process for the continuous supercritical or near-critical drying of microporous silica beads (2 to 12 mm) in countercurrent mode, in which the particles are led in a moving bed counter to a drying fluid stream made up of isopropanol. The particles are situated at the bottom of the vessel in a supercritical fluid or a supercritical mixture of fluids and are decompressed via a discharge vessel or two alternating discharge vessels.

The processes known from the prior art have the disadvantage that they are associated with a high apparatus expense and/or involve high residence times and a high consumption of materials.

SUMMARY OF THE INVENTION

Proceeding from the prior art, an object of the present invention was that of providing a process for drying mesoporous and macroporous gel particles which can be operated economically and with a low apparatus expense.

This object is achieved according to the invention by a process for drying gel particles, in particular for producing aerogels, comprising the steps of (i) providing a suspension comprising gel particles (P1) and a solvent (LM), (ii) introducing the suspension into a column through which carbon dioxide flows in countercurrent, (iii) removing the dried aerogel particles from the column, wherein the suspension is introduced in the top region of the column and the dried aerogel particles are removed in the lower region of the column, wherein the pressure and temperature in the column are set such that the mixture of carbon dioxide and solvent is supercritical or is virtually supercritical.

DETAILED DESCRIPTION OF THE INVENTION

For the purposes of the present invention, a gel is a crosslinked system based on a polymer which is in contact with a liquid (known as solvogel or lyogel) or with water as liquid (aquagel or hydrogel). The polymer phase forms a continuous three-dimensional network here.

In the context of the present invention, the term "supercritical" is understood to mean that the mixture of $CO_2$ and solvent is in the supercritical state when the operating pressure is above the critical pressure of the mixture at the respective operating temperatures.

In the context of the present invention, the state of a mixture of solvent and $CO_2$ is referred to as "virtually supercritical" when the pressure and/or the temperature of the mixture is/are below the critical pressure and/or the critical temperature of the mixture, but the interfacial tensions that arise between the phases are already reduced in such a way that they do not lead to a destruction of the pore structure.

Suitable pressure and temperature ranges can vary within wide ranges. If, for example, ethanol is used as solvent, the process is for example carried out at a temperature in the range from 30 to 260° C. and a pressure in the range from 70 to 160 bar.

According to the invention, $CO_2$ can for example be supplied and removed via side draws, for example via a partial crosscurrent flow. This mode of operation has proven to be particularly advantageous for longer drying times and/or larger particle diameters.

In the context of the present invention, the particles can be removed semi-continuously via two or more alternating discharge vessels. Advantageously, the column can be installed above the discharge vessels, so that the particles fall into the vessels as a result of gravity.

In the context of an alternative embodiment, it is also possible for the removal to be effected continuously and in a valve-free manner via a capillary. In this case, the column is preferably installed above an intermediate collecting vessel into which the particles fall as a result of gravity. A fluidization aid is preferably used to discharge the particles from the intermediate vessel by means of a $CO_2$ stream, in order to prevent blocking of the capillary inlet.

According to a further embodiment, the present invention accordingly relates to a process for drying gel particles as described above, wherein the aerogel particles obtained are removed continuously in a valve-free manner.

In the process, for example, aerogel particles are decompressed continuously in a valve-free manner via a capillary from a pressurized storage vessel, for example the counter-current extraction column, to ambient pressure. In the context of the present invention, the pressure can in this case for example be in the range from 80 to 200 bar, preferably in the range from 100 to 150 bar. The pressure drop due to fluid-wall friction, particle-wall friction and particle-particle friction/collision over the whole pipe length must preferably, depending on the gas mass flow rate, be precisely great enough that the pressure difference between the storage vessel and the environment is overcome. As a result, no valve is required for forming an additional pressure drop. The particles decompressed to ambient pressure (or virtually ambient pressure) are lastly separated from the gas stream by cyclone separators or filters and collected.

According to the invention, the drying is effected under supercritical conditions. Such a drying process is known per se to those skilled in the art. Supercritical conditions indicate a temperature and a pressure at which $CO_2$ or any particular solvent mixture that is used to remove the gelation solvent is in the supercritical state. In this way, the shrinkage of the gel body when the solvent is removed can be reduced. Carbon dioxide is in particular well suited particularly for thermally sensitive substances because of its favorable critical temperature of 31° C. In general, the choice of the drying fluid depends on various points. If the desire is to set "near-"critical conditions, inter alia, the thermal stability of the particles to be dried or of the end product determines the choice of the drying fluid and hence also limits the critical temperature of the drying fluid.

The continuous decompression is preferably effected by pipes/capillaries having a small diameter in order to keep the pressure drop large. However, a certain diameter must be maintained in order to convey particles without blocking. Suitable pipe internal diameters are in the range from 1.5 mm-50 mm, preferably in the range from 1.6 mm-20 mm. The pipe internal diameter, the proportion of solids by volume, the length of the pipe and the type and number of internals, and the gas mass flow rate, determine the pressure drop across the pipeline.

Pipe lengths can be in the range from 30 m to 400 m and the gas mass flow rates can be from 3 kg/h to 20 t/h.

The discharge of the particles from the storage vessel, for example from the bottom of the column for continuous drying, into the capillary is preferably effected using fluidization aids and metering devices, but can also be effected without fluidization aids and metering devices depending on the material properties of the aerogel. The decompression is effected through an externally heated capillary to prevent condensation of $CO_2$ or freezing of $CO_2$ in the pores of the aerogels. For the heating, the pipeline/capillary can as in the case of a tube bundle heat exchanger be led with a single pipe and a great many passes through a shell with a heat transfer fluid. Various internals, such as pipe constrictions and pipe expansions, can be incorporated into the capillary in order to increase the pressure drop.

In a further embodiment of the invention, a less compressible, supercritical $CO_2$-miscible, inert gas such as for example nitrogen can be added before or during the decompression. As a result, the pressure-dependent change in volume of the gas mixture becomes smaller and the decompression rates arising can be reduced with prior partial separation of the gas stream in the cyclone with the same total gas mass flow rate.

In a further embodiment of the invention, the decompression can also be carried out in stages: The staged decompression consists of 2 or more capillary parts, such as for example the above-described heat exchangers. The capillary parts/heat exchangers can be operated at different temperature levels, for example in order to reduce the energy requirement for compensating for the Joule-Thomson effect or in order at low pressures to utilize the Joule-Thomson effect for the cooling of sols.

For example, in a staged decompression with different temperature levels, a first stage can be operated at a pressure in the range from 60 to 120 bar at 50° C., a further stage can be operated at a pressure in the range from 40 to 60 bar at 25° C., and a third stage can be operated at a pressure in the range from 1 to 40 bar at 5° C.

A further embodiment of the staged decompression is the interconnection of cyclones between the stages. Between the individual decompression stages, the aerogel particles can be separated from a portion of the gas stream in a cyclone or filter. The particle-free gas stream can then be recycled. The remaining gas stream with the particles passes into the next decompression stage. In this way, the required compression work for the decompression gas stream can be reduced.

The combination of both embodiments of the staged decompression is of course also possible.

According to the invention, for example, the staged decompression with different temperature levels and partial recycling of the $CO_2$ can be combined with the separation in a cyclone. For example, a first stage at a pressure in the range from 80 to 120 bar at 50° C., a separation in a cyclone, a further separating stage at a pressure in the range from 55 to 80 bar at 40° C., a further stage at a pressure in the range from 40 to 55 bar at 25° C., and optionally a further stage at a pressure in the range from 1 to 40 bar at 5° C., is possible.

A suitable ratio or a suitable setting of the material streams and flow speeds of drying fluid and particles to be dried for the establishment and maintenance of the counter-current can be determined by those skilled in the art within the scope of experiments customary in the art. This setting depends inter alia on the height of the column, on the internal mass transfer and heat transfer in the particles to be dried and on the fluidization point, i.e. on the density and particle size/particle size distribution of the porous particles to be dried.

In the context of the invention, the process is preferably conducted continuously. According to a further preferred embodiment, the carbon dioxide stream is circulated.

It has surprisingly been found that with the process according to the invention gel particles can be dried rapidly and gently. According to the invention, it is in particular possible to carry out the drying at low temperatures so that even sensitive materials can be dried well.

According to the invention, the process is conducted here such that the gel particles preferably sediment in the carbon dioxide stream.

According to a further embodiment, the present invention accordingly relates to a process for drying gel particles as described above, wherein the gel particles sediment in countercurrent.

Suitable ranges for proportions by mass of solvent at the $CO_2$ outlet can vary within wide ranges depending on the $CO_2$ mass flow rate and the column height. In the context of the present invention, the outlet proportion by mass of solvent, for example of ethanol in $CO_2$, can vary approximately in the range from 30% to 98%.

In the context of the present invention, the mass flow rate is set depending on the diameter of the column in accordance with principles known per se to those skilled in the art such that the particles still sediment.

According to a further embodiment, the present invention accordingly relates to a process for drying gel particles as described above, wherein the $CO_2$ mass flow rate is set such that dried aerogel particles are obtained.

In the context of the present invention, the $CO_2$ mass flow rate is for example set in the range from 0.75 kg/h to 25 t/h.

According to a further embodiment, the present invention accordingly relates to a process for drying gel particles as described above, wherein the $CO_2$ mass flow rate is set in the range from 0.75 kg/h to 25 t/h.

In the context of the present invention, it is possible to dry gel particles having for example an average diameter in the range from 20 µm to 1000 µm, preferably in the range from 20 µm to 500 µm, more preferably in the range from 50 µm to 250 µm.

According to a further embodiment, the present invention accordingly relates to a process for drying gel particles as described above, wherein the gel particles have an average diameter in the range from 20 µm to 1000 µm.

The particles are preferably led through the column in free fall in countercurrent to supercritical $CO_2$. Astonishingly, it could be shown that the markedly shorter residence times of free fall compared to the moving bed suffice for drying the particles and no conveying or associated further internals are necessary.

The presented process is suitable in particular for the continuous countercurrent drying of relatively small particles in the range from 20 µm to 500 µm and has the advantage that no conveying screw or moving internals are required in the drying vessel.

The aerogel particles are dried continuously in countercurrent with $CO_2$ above the critical point of the mixture in a type of countercurrent extraction column. The gel particle suspension, consisting of gel particles suspended in an organic solvent which is readily soluble in $CO_2$, is supplied at the top of the column with a pump. The gel particles sediment to the bottom of the column in the gravitational field counter to the upwardly flowing $CO_2$. The supercritical $CO_2$ flows through the column from bottom to top and in the process extracts the solvent from the gel particles. Fully dried (solvent-free), preferably mesoporous aerogel particles are thus obtained at the bottom of the column, while a highly loaded solvent/$CO_2$ stream is obtained at the top of the column.

The particle size is a decisive factor in the continuous countercurrent extraction. With a constant $CO_2$ mass flow rate, the particle size determines the drying time and residence time in the column. With constant process conditions, the ratio of drying time/residence time increases as the particle diameter increases, since firstly the required drying time increases and at the same time the residence time decreases.

Likewise, with a constant particle diameter the ratio of drying time/residence time can be set in particular by changing the residence time by means of the process parameters. The residence time is influenced by the $CO_2$ density and also by the upwardly directed $CO_2$ mass flow rate. Increasing the $CO_2$ mass flow rate directed upwardly counter to the falling direction of the particles leads, with an unchanged relative speed, to a decrease in the absolute speed of the particles and hence to an increase in the residence time. The ratio of required drying time/residence time should preferably be <1.

Suitable processes for producing gel particles are known per se. In the context of the present invention, the gel may for example be an organic or an inorganic gel.

In principle, a gel can be produced by hydrolysis of a suitable precursor and subsequent condensation (gelation).

Suitable gel material precursors for inorganic or hybrid materials can be inorganic or a mixture of organic and inorganic components. Sols can be catalyzed in order to induce gelation by a variety of methods. Examples include setting the pH and/or the temperature of a dilute metal oxide sol to a point at which gelation occurs. Suitable materials for forming inorganic aerogels are oxides of metals, transition metals and semimetals capable of forming oxides, such as silicon, aluminum, titanium, zirconium, hafnium, yttrium, vanadium and the like.

The main synthetic route for forming an inorganic aerogel may be the hydrolysis and condensation of a suitable metal alkoxide.

Suitable precursors for the gelation for organic gels are likewise known to those skilled in the art.

Suitable gels are for example those based on polysaccharide-containing materials, such as for example alginates. It is for example known that alkali metal alginates such as sodium alginate are water-soluble, whereas alkaline earth metal alginates such as calcium alginates are insoluble in water. Gels can thus be produced from water-soluble polysaccharides, especially natural polysaccharides such as alginates. According to the present invention, water-soluble polysaccharides can preferably be used to form gels. Among these, the use of natural polysaccharides and/or their derivatives is particularly attractive because of their stability, availability, renewability and low toxicity.

In connection with the present invention, "water-soluble" means that the solubility in water is sufficient to form a solution that can be used to produce a gel. According to the present invention, a gel is formed from the water-soluble polysaccharide and a suitable crosslinker. The polysaccharide used for the process of the present invention must be suitable for forming a gel with a crosslinker, in particular has to have suitable functional groups. Natural polysaccharides such as agar, alginate, carrageenan, cellulose, hyaluronic acid, pectin, starch and xanthan gum, and semi-synthetic polysaccharides such as modified cellulose, chitin and chitosan, are particularly preferred.

According to the present invention, a hydrogel is formed which is then subjected to a solvent exchange. According to the present invention, the water-soluble polysaccharide is preferably selected from the group consisting of agar, alginate, carrageenan, cellulose, hyaluronic acid, pectin, starch, xanthan gum, modified cellulose, chitin and chitosan.

Further natural or synthetic hydrocolloid-forming polymers include (partially) water-soluble, natural or synthetic polymers which in aqueous systems form gels or viscous solutions. They are carefully selected from further natural polysaccharides, synthetically modified derivatives thereof or synthetic polymers. Further polysaccharides include, for example, carrageenan, pectins, tragacanth, guar gum, carob seed flour, agar, gum arabic, xanthan gum, natural and modified starches, dextrans, dextrin, maltodextrins, chitosan, glucans, such as beta-carboxymethylcellulose, 1,3-glucan, beta-1,4-glucan, cellulose, mucopolysaccharides, such as in particular hyaluronic acid. Synthetic polymers include cellulose ethers, polyvinyl alcohol, polyvinylpyrrolidone, synthetic cellulose derivatives, such as methyl cellulose, carboxycellulose, carboxymethylcellulose, especially sodium carboxymethylcellulose, cellulose esters, cellulose ethers such as hydroxypropylcellulose, polyacrylic acid, polymethacrylic acid, poly(methyl methacrylate) (PMMA), polymethacrylate (PMA), polyethylene glycols, etc. Mixtures of these polymers can also be used.

The reaction temperature can be in the range from 0 to 100° C., preferably 5 to 75° C., in particular 10 to 50° C. The sol concentration, i.e. the concentration of the reagents in the solvent, can be in the range from 0.25% to 65% by weight, preferably 0.5% to 60% by weight, in particular 1% to 10% by weight.

In principle, any solvent (LM) can be used so long as it is miscible with carbon dioxide or has a sufficient boiling point allowing the removal of the solvent from the resulting gel. In general, the solvent is a low-molecular-weight organic compound, i.e. an alcohol having 1 to 6 carbon atoms, preferably 2 to 4, although other liquids known in the field can be used. Examples of possible solvents include ketones, aldehydes, alkyl alkanoates, amides such as formamide, N-methylpyrrolidone, N-ethylpyrrolidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are also possible.

Examples of other useful liquids include, but are not limited to: ethyl acetate, ethyl acetoacetate, acetone, dichloromethane, isopropanol, methyl ethyl ketone, tetrahydrofuran, propylene carbonate and the like.

Further possibilities of solvents are acetals, in particular diethoxymethane, dimethoxymethane and 1,3-dioxolane.

Dialkyl ethers and cyclic ethers are also suitable as solvents. Preferred dialkyl ethers are in particular those having 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ester ether, methyl butyl ether, methyl isobutyl ether, methyl t-butyl ether, ethyl n-butyl ether, ethyl isobutyl ether and ethyl t-butyl ether. Preferred cyclic ethers are in particular tetrahydrofuran, dioxane and tetrahydropyran. Particular preference is given to aldehydes and/or ketones as solvents. Aldehydes or ketones suitable as solvents are in particular those which correspond to the general formula R2-(CO)—R1, where R1 and R2 are each hydrogen or an alkyl group having 1, 2, 3, 4, 5, 6 or 7 carbon atoms. Suitable aldehydes or ketones are in particular acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer B. 1,2,3,6-tetrahydrobenzaldehyde, 6-methyl-3-cyclohexenaldehyde, cyanoacetaldehyde, ethyl glyoxylate, benzaldehyde, acetone, diethyl ketone, methyl ethyl ketone, methyl isobutyl ketone, methyl n-butyl ketone, methyl pentyl ketone, dipropyl ketone, ethyl isopropyl ketone, ethyl butyl ketone, diisobutyl ketone, 5-methyl-2-acetylfuran, 2-acetylfuran, 2-methoxy-4-methylpentan-2-one, 5-methylheptan-3-one, 2-heptanone, octanone, cyclohexanone, cyclopentanone and acetophenone.

The abovementioned aldehydes and ketones can also be used in the form of mixtures. In many cases, particularly suitable solvents are obtained by using two or more completely miscible compounds selected from the abovementioned solvents.

According to a further embodiment, the present invention accordingly relates to a process for drying gel particles as described above, wherein the solvent (LM) is selected from the group consisting of methanol, ethanol, propanol, butanol, pentanol and hexanol.

In addition, one or more auxiliary substances could be present in the suspension according to the present invention. Auxiliary substances include: fillers, pH-adjusting agents, such as buffer substances, stabilizers, co-solvents, pharmaceutically and cosmetically customary or other dyes and pigments, preservatives, food supplements, vitamins, active agents, plasticizers, lubricants and lubricants.

The process of the present invention can also comprise further steps, for example suitable treatment steps.

At the end of the supercritical extraction, the pressure is released at a rate which enables optimal material properties in combination with a suitable time consumption, and the particles are removed from the column.

It has been found that the process according to the invention makes it possible to obtain aerogel particles having improved particle size and porosity. In particular, stable, dry and highly porous aerogel particles having high surface areas and a high pore volume are obtained.

Continuous decompression for temperature-sensitive substances after drying by the LTSCD process via valves does not currently exist, since the aerogel particle-$CO_2$ stream has to be heated strongly before the decompression in order to compensate for the Joule-Thomson effect. The process presented makes it possible to reduce the maximum temperature experienced by the aerogel product, as heating is effected over a longer distance at moderate temperature.

Continuous valve-free decompression is known, but it has to date not been used for porous materials. In particular for aerogels, continuous decompression did not appear to be possible on account of the low decompression rates specified in the prior art which are required to obtain the pore structure. By way of the valve-free continuous decompression of aerogels, a truly continuous process for producing aerogels by means of the LTSCD process is possible for the first time. This means that there is no requirement for separate, large-volume discharge vessels. The valve-free decompression also has the result that the problems of abrasion and blocking, which accompany the use of valves for the decompression of particles, are avoided.

The product obtained in the process of the present invention is a micrometer-sized powder formed of porous aerogel having a porosity of at least 70% by volume. The size of the particles can in general vary, the particle size being in the range from 20 μm to 1000 μm. The aerogels obtained according to the invention can be inorganic or organic aerogels.

In further embodiments, the aerogel comprises average pore diameters of from approximately 2 nm to approximately 100 nm, for example in the range from 5 to 55 nm or in the range from 10 to 50 nm. In additional embodiments, the average pore diameters of dried gel materials can be approximately 4 nm, approximately 6 nm, approximately 8 nm, approximately 10 nm, approximately 12 nm, approximately 14 nm, approximately 16 nm, approximately 18 nm, approximately 20 nm, approximately 25 nm, approximately 30 nm, approximately 35 nm, approximately 40 nm or approximately 45 nm, approximately 50 nm or else approximately 55 nm. In the context of the present invention, the surface area, the pore sizes and the pore volumes were measured by BET in accordance with ISO 9277:2010, unless stated otherwise. This international standard defines the determination of the total specific external and internal surface area of disperse (e.g. nanopowders) or porous solids by measurement of the amount of physically adsorbed gas by the Brunauer-Emmett-Teller (BET) method. It takes into account the recommendations of the International Union for Pure and Applied Chemistry (IUPAC) of 1984 and 1994.

According to a further embodiment, the present invention accordingly relates to a process for drying gel particles as described above, wherein the gel particles have an average pore diameter in the range from 2 to 100 nm.

According to a further aspect, the present invention also relates to aerogel particles obtainable or obtained by a process for drying gel particles as described above.

The aerogel particles obtained or obtainable by the process of the present invention are suitable for various applications.

The invention also relates to building materials and vacuum insulation panels comprising the pulverulent nanoporous materials and to the use of pulverulent nanoporous materials for thermal insulation. The materials obtained according to the invention are preferably used for insulation with respect to heat in particular in buildings or for insulation with respect to cold, in particular in mobile transport applications or in stationary applications, for example in refrigerators of for mobile applications. Fibers can be used as additives for mechanical reinforcement.

According to a further aspect, the present invention also relates to the use of aerogel particles, obtainable or obtained by a process for drying gel particles as described above, for medical and pharmaceutical applications, as additive or carrier material for additives for foods, as catalyst support, for cosmetic, hygiene, washing and cleaning applications, for the production of sensors, for thermal insulation or as a core material for VIPs.

Further embodiments of the present invention can be found in the examples and as described below. It will be appreciated that the features of the subject matter/process according to the invention or of the uses according to the invention recited hereinabove and elucidated hereinbelow may be used not only in the combination specified in each case but also in other combinations without departing from the scope of the invention. Thus, for example, the combination of a preferred feature with a particularly preferred feature, or of a feature not characterized further with a particularly preferred feature etc., is also encompassed implicitly even if this combination is not mentioned explicitly.

Illustrative embodiments of the present invention are recited hereinbelow but do not limit the present invention. The present invention especially also encompasses those embodiments resulting from the dependency references and hence combinations specified hereinbelow.

1. A process for drying gel particles, comprising the steps of
   (i) providing a suspension comprising gel particles (P1) and a solvent (LM),
   (ii) introducing the suspension into a column through which carbon dioxide flows in countercurrent,
   (iii) removing the dried aerogel particles from the column, wherein the suspension is introduced in the top region of the column and the dried aerogel particles are removed in the lower region of the column,
   wherein the pressure and temperature in the column are set such that the mixture of carbon dioxide and solvent is virtually supercritical or is supercritical.

2. The process according to embodiment 1, wherein the gel particles sediment in countercurrent.

3. The process according to either of embodiments 1 and 2, wherein the aerogel particles obtained are removed continuously in a valve-free manner.

4. The process according to any of embodiments 1 to 3, wherein the $CO_2$ mass flow rate is set such that dried aerogel particles are obtained.

5. The process according to any of embodiments 1 to 4, wherein the $CO_2$ mass flow rate is set in the range from 0.75 kg/h to 25 t/h.

6. The process according to any of embodiments 1 to 5, wherein the gel particles have an average diameter in the range from 20 μm to 1000 μm.

7. The process according to any of embodiments 1 to 6, wherein the gel particles have an average pore diameter in the range from 2 to 100 nm.

8. The process according to any of embodiments 1 to 7, wherein the solvent (LM) is selected from the group consisting of methanol, ethanol, propanol, butanol, pentanol and hexanol.

9. Aerogel particles, obtainable or obtained by a process according to any of embodiments 1 to 8.

10. Aerogel particles, obtainable or obtained by a process for drying gel particles comprising the steps of
   (i) providing a suspension comprising gel particles (P1) and a solvent (LM),
   (ii) introducing the suspension into a column through which carbon dioxide flows in countercurrent,
   (iii) removing the dried aerogel particles from the column, wherein the suspension is introduced in the top region of the column and the dried aerogel particles are removed in the lower region of the column,
   wherein the pressure and temperature in the column are set such that the mixture of carbon dioxide and solvent is virtually supercritical or is supercritical.

11. The aerogel particles according to embodiment 10, wherein the gel particles sediment in countercurrent.

12. The aerogel particles according to either of embodiments 10 and 11, wherein the aerogel particles obtained are removed continuously in a valve-free manner.

13. The aerogel particles according to any of embodiments 10 to 12, wherein the $CO_2$ mass flow rate is set such that dried aerogel particles are obtained.

14. The aerogel particles according to any of embodiments 10 to 13, wherein the $CO_2$ mass flow rate is set in the range from 0.75 kg/h to 25 t/h.

15. The aerogel particles according to any of embodiments 10 to 14, wherein the gel particles have an average diameter in the range from 20 μm to 1000 μm.

16. The aerogel particles according to any of embodiments 10 to 15, wherein the gel particles have an average pore diameter in the range from 2 to 100 nm.

17. The aerogel particles according to any of embodiments 10 to 16, wherein the solvent (LM) is selected from the group consisting of methanol, ethanol, propanol, butanol, pentanol and hexanol.

18. The use of aerogel particles according to any of embodiments 10 to 17 or of aerogel particles obtained or obtainable by a process according to any of embodiments 1 to 8 for medical and pharmaceutical applications, as additive or carrier material for additives for foods, as catalyst support, for cosmetic, hygiene, washing and cleaning applications, for the production of sensors, for thermal insulation or as a core material for VIPs.

The invention is elucidated in more detail hereinafter by way of examples.

EXAMPLES

I. Configuration Examples

A number of rough calculations and a configuration example are given below. In the following configuration, the operating conditions (120 bar, 50° C.) and the particle properties (particle porosity E=0.93 and tortuosity r=2.5) are assumed to be constant. Hereinafter, the throughput is also assumed to initially be very low, meaning that the fluid phase is approximately described with pure $CO_2$.

13

1. Calculation of Drying Times

The drying times for particles of various diameters were simulated under the assumption of a one-dimensional mass transfer. The physical variables of the fluid ($CO_2$ and ethanol) were modeled using the Peng-Robinson equation of state with appropriate mixing rules. The particles are described via a particle porosity of $\varepsilon=0.93$ (corresponding to $V_{pores}=8$ cm$^3$/g) and a tortuosity of r=2.5.

1.1 Diffusion in the Particle

The following drying times (table 1) were calculated under the assumption that the rate-determining step was the diffusion within the particle. The mass transfer from the particle to the surrounding fluid phase was assumed to be very large. The drying times for 5 μm-large particles are only a few milliseconds and in the range up to 100 μm are less than a second.

TABLE 1

| Calculated drying times of alginate aerogel particles at 120 bar and 50° C. | | | | | | | |
|---|---|---|---|---|---|---|---|
| | Particle diameter [μm] | | | | | | |
| | 5 | 25 | 50 | 100 | 200 | 300 | 500 |
| calculated drying time [s] | 0.0019 | 0.0479 | 0.1916 | 0.7664 | 3.0655 | 6.897 | 19.159 |

1.2 Consideration of Mass Transfer

The drying times collated in table 2 took the mass transfer from the particle to the surrounding fluid phase into consideration. The mean mass transfer coefficients were calculated on the basis of an Sh correlation for a single sphere. Interestingly, the mass transfer coefficient is a function only of the particle diameter and not of the flow speed, since the relative speed and hence Re is constant and only changes once the particles are discharged.

14 in the absolute drying time and the drying times remain within the same orders of magnitude.

2. Discharge of Particles: $CO_2$ Mass Flow Rate and Particle Diameter

Besides the drying time, another critical aspect of the continuous supercritical drying in a countercurrent column is the fluid dynamics and associated residence time of the particles. The descent velocity of particles can be described via a relationship between the Archimedes number and Reynolds number. For the transition region between the Stokes and Newtonian regions the following applies according to MARTIN:

$$Re = 18\left[\sqrt{1 + \frac{1}{9}\sqrt{Ar}} - 1\right]^2$$

The (descent) velocity calculated from the Re number represents the relative speed between particle and surrounding fluid and depends on the particle diameter. Depending on the magnitude of the upwardly directed $CO_2$ stream, therefore, the absolute descent velocity of the particles is reduced or particles are discharged with the $CO_2$ stream via the top of the column.

For a column with an internal diameter of $d_i=20.57$ mm and hence a free cross section of A=3.32E-04 m$^2$ and a

TABLE 2

| Calculated drying times of alginate aerogel particles at 120 bar and 50° C. taking the mean mass transfer coefficients into consideration | | | | | | | |
|---|---|---|---|---|---|---|---|
| | Particle diameter [μm] | | | | | | |
| | 5 | 25 | 50 | 100 | 200 | 300 | 500 |
| β [m/s] | 8.11E−03 | 2.05E−03 | 1.40E−03 | 1.11E−03 | 9.62E−04 | 8.98E−04 | 8.28E−04 |
| calculated drying time [s] | 0.0028 | 0.0644 | 0.2382 | 0.8765 | 3.2914 | 7.255 | 19.609 |

The relative change in the drying times when taking the mass transfer into consideration compared to the assumption of an infinite mass transfer coefficient is greatest for small particle diameters and becomes smaller as the particle diameter increases. However, there is relatively little change column height of 500 mm, the calculated residence times of alginate aerogel particles of various diameters are collated in table 3 for various $CO_2$ mass flow rates. This was based on an average apparent density of the particles consisting of wet and completely dried particles.

TABLE 3

| Calculated residence times of alginate aerogel particles with $\varepsilon = 0.93$ | | | | | | | |
|---|---|---|---|---|---|---|---|
| CO₂ mass flow | Particle diameter [µm] | | | | | | |
| rate [kg/h] | 5 | 25 | 50 | 100 | 200 | 300 | 500 |
| 0.5 | discharged | discharged | 286.6 | 73.4 | 29.2 | 19.0 | 12.0 |
| 1 | discharged | discharged | 756.5 | 84.6 | 30.7 | 19.6 | 12.2 |
| 1.5 | discharged | discharged | discharged | 100.5 | 32.4 | 20.3 | 12.5 |
| 2 | discharged | discharged | discharged | 125.1 | 34.3 | 21.0 | 12.7 |
| 3 | discharged | discharged | discharged | 274.2 | 39.0 | 22.6 | 13.3 |

The porosity of the aerogel particles has a great influence on the theoretical descent velocity and residence time of the particles in the $CO_2$ stream. For relatively low porosities, as can be seen from table 4, smaller particles can also be dried without being discharged and/or higher $CO_2$ flow rates and hence higher particle throughputs can be chosen for the same column height.

TABLE 4

| Calculated residence times of alginate aerogel particles with $\varepsilon = 0.85$ | | | | | | | |
|---|---|---|---|---|---|---|---|
| CO₂ mass flow | Particle diameter [µm] | | | | | | |
| rate [kg/h] | 5 | 25 | 50 | 100 | 200 | 300 | 500 |
| 0.5 | discharged | 971,566186 | 136.7 | 44.6 | 19.5 | 13.2 | 8.6 |
| 1 | discharged | discharged | 176.5 | 47.9 | 20.1 | 13.4 | 8.7 |
| 1.5 | discharged | discharged | 256.5 | 51.8 | 20.7 | 13.7 | 8.8 |
| 2 | discharged | discharged | 526.6 | 56.5 | 21.4 | 14.0 | 8.9 |
| 3 | discharged | discharged | discharged | 69.3 | 22.9 | 14.6 | 9.2 |

3. Influence of the Mass Flow Rate on the Ratio of Required Drying Time/Residence Time For configuring the column length, the ratio of residence time to drying time should understandably be >1. Table 5 reports the ratios of residence time/drying time for a column height of 500 mm. The particles having a diameter of 500 µm would not be completely dried for the $CO_2$ mass flow rates shown of 0.5 kg/h to 3 kg/h. This could be counteracted by a further increase in the $CO_2$ mass flow rate, which would however result in smaller particles being discharged. Alternatively, lengthening of the column height leads to a proportional increase in the residence time and hence to a proportional increase in the residence time/drying time ratio. Doubling the column height to for example 1 m would lead to a doubling of the residence time/drying time ratio, and hence also to a drying of particles having the diameter d=500 µm, without smaller particles being discharged.

TABLE 5

| Ratio of residence time/drying time for 0.5 m column height with an infinite mass transfer coefficient | | | | | | | |
|---|---|---|---|---|---|---|---|
| CO₂ mass flow | Particle diameter [µm] | | | | | | |
| rate [kg/h] | 5 | 25 | 50 | 100 | 200 | 300 | 500 |
| 0.5 | discharged | discharged | 1495.89 | 95.81 | 9.51 | 2.76 | 0.63 |
| 1 | discharged | discharged | 3948.27 | 110.38 | 10.01 | 2.84 | 0.64 |
| 1.5 | discharged | discharged | discharged | 131.10 | 10.56 | 2.94 | 0.65 |
| 2 | discharged | discharged | discharged | 163.27 | 11.18 | 3.04 | 0.67 |
| 3 | discharged | discharged | discharged | 357.75 | 12.72 | 3.28 | 0.69 |

TABLE 6

| Ratio of residence time/drying time for 1 m column height with an infinite mass transfer coefficient | | | | | | | |
|---|---|---|---|---|---|---|---|
| CO₂ mass flow | Particle diameter [µm] | | | | | | |
| rate [kg/h] | 5 | 25 | 50 | 100 | 200 | 300 | 500 |
| 0.5 | discharged | discharged | 2991.77 | 191.61 | 19.03 | 5.51 | 1.25 |
| 1 | discharged | discharged | 7896.54 | 220.76 | 20.01 | 5.69 | 1.28 |

TABLE 6-continued

| Ratio of residence time/drying time for 1 m column height with an infinite mass transfer coefficient | | | | | | | |
|---|---|---|---|---|---|---|---|
| CO$_2$ mass flow | Particle diameter [μm] | | | | | | |
| rate [kg/h] | 5 | 25 | 50 | 100 | 200 | 300 | 500 |
| 1.5 | discharged | discharged | discharged | 262.20 | 21.12 | 5.88 | 1.30 |
| 2 | discharged | discharged | discharged | 326.54 | 22.37 | 6.09 | 1.33 |
| 3 | discharged | discharged | discharged | 715.50 | 25.45 | 6.55 | 1.39 |

4. Influence of Particle Loading on Drying

In the previous rough calculations, the assumption was made that almost pure $CO_2$ is also present at the outlet, that is to say that only very low particle loadings are operated with. In industrial application, the aim in the countercurrent operation is to withdraw at the top of the column a $CO_2$ stream which is as highly loaded with ethanol (EtOH) as possible in order to reduce the $CO_2$ use per kg of aerogel. For this, the lengthened drying time has to be compensated for by a corresponding increase in the column height. For example, the drying shown in table 6 of 1 l/h of 500 μm particles in a 1 m tall column is not achieved with $CO_2$ mass flow rates of 1 kg/h and less. (Cf. table 7) With an increase of the column to 3 m, however, drying is also achieved with 1 kg/h of $CO_2$ and the high outlet proportion by mass of EtOH of 64% (w/w) can be maintained.

TABLE 7

| Drying 1 l/h of 500 μm aerogel particles with different CO$_2$ mass flow rates in countercurrent in a column with a height of 1 m | | |
|---|---|---|
| CO2 mass flow rate [kg/h] | Proportion by mass of EtOH in CO$_2$ [—] | Proportion by mass of EtOH in particles [—] |
| 0.50 | 0.97 | 0.24 |
| 0.75 | 0.80 | 0.06 |
| 1.00 | 0.63 | 0.02 |
| 2.00 | 0.32 | 0.00 |
| 3.00 | 0.21 | 0.00 |
| 4.00 | 0.16 | 0.00 |

II. Examples

The principle feasibility of the drying process could be demonstrated on a pilot plant.

A suspension of alginate gel particles having diameters of 50-300 μm (14% (v/v)) in ethanol was conveyed out of a storage vessel at 23 ml/min into the top of a column with a length of 0.5 m and an internal diameter $d_i$=20.6 mm. At an operating pressure of 120 bar and an operating temperature of 50° C., supercritical $CO_2$ was conveyed at 40 g/min in countercurrent to the particle stream. The collecting vessel was depressurized after the experiment.

The gel particles sediment counter to the $CO_2$ stream, while the free ethanol, despite the likewise higher density of the ethanol-$CO_2$ mixture than $CO_2$, is discharged via the top in the $CO_2$-ethanol mixed stream. The comparatively short residence time of the particles compared to a moving bed surprisingly led to complete drying of the aerogel particles. The particles that had fallen into the collecting vessel have, with pore volumes of 9.4 cm$^3$/g and BET surface areas of 500 m$^2$/g, similar properties to the aerogel particles produced by the same gelation process and dried in batches.

The invention claimed is:

1. A continuous process for drying gel particles or for producing aerogels, the process comprising:
   (i) providing a suspension comprising gel particles and a solvent,
   (ii) introducing the suspension into a column through which carbon dioxide flows in countercurrent, and
   (iii) removing dried aerogel particles from the column,
   wherein the suspension is introduced in a top region of the column and the dried aerogel particles are removed in a lower region of the column,
   wherein the pressure and temperature in the column are set such that the mixture of carbon dioxide and solvent is virtually supercritical or is supercritical,
   wherein aerogel particles obtained are removed continuously in a valve-free manner using a capillary, and
   wherein the gel particles sediment in countercurrent wherein the column has a column length in which a ratio of drying time/residence time is <1.

2. The process according to claim 1, wherein a $CO_2$ mass flow rate is set such that dried aerogel particles are obtained.

3. The process according to claim 1, wherein the gel particles have an average diameter in the range from 20 μm to 1000 μm.

4. The process according to claim 1, wherein the gel particles have an average pore diameter in the range from 2 to 100 nm.

5. The process according to claim 1, wherein the solvent is selected from the group consisting of methanol, ethanol, propanol, butanol, pentanol and hexanol.

6. The process according to claim 1, wherein the column is installed above an intermediate collecting vessel into which the dried aerogel particles fall as a result of gravity, and/or using a fluidization aid to discharge the particles from an intermediate vessel by means of a $CO_2$ stream to prevent blocking of a capillary inlet.

7. The process according to claim 6, wherein the carbon dioxide mass flow rate directly upward countercurrent to a falling direction of the particles is to a ratio of drying time/residence time of <1.

* * * * *